United States Patent [19]
Braisted et al.

[11] Patent Number: 4,847,862
[45] Date of Patent: Jul. 11, 1989

[54] GLOBAL POSITIONING SYSTEM COURSE ACQUISITION CODE RECEIVER

[75] Inventors: Paul E. Braisted, San Jose; Ralph F. Eschenbach, Redwood City, both of Calif.

[73] Assignee: Trimble Navigation, Ltd., Sunnyvale, Calif.

[21] Appl. No.: 178,980

[22] Filed: Apr. 7, 1988

[51] Int. Cl.$^4$ ............................................. H04K 1/00
[52] U.S. Cl. .................................. 375/1; 375/120; 370/104; 370/107
[58] Field of Search .................. 375/1, 115, 119, 120; 370/104, 107; 455/173, 257, 330

[56] References Cited

U.S. PATENT DOCUMENTS

| | | | |
|---|---|---|---|
| 4,247,939 | 1/1981 | Stronswold | 375/1 |
| 4,485,477 | 11/1984 | Nossen | 375/1 |
| 4,530,103 | 7/1985 | Mosley, Jr. et al. | 375/1 |
| 4,754,465 | 7/1988 | Trimble | 375/1 |

Primary Examiner—Salvatore Cangialosi
Attorney, Agent, or Firm—Thomas E. Schatzel

[57] ABSTRACT

Two receiver channels each driven by a common local oscillator signal are employed. The signal developed by the first receiver channel is used to drive in phase (I) and quadrature (Q) counters of a Castas-loop, which phase-locks to the signal. The signal developed by the second receiver channel is used to drive another pair of in phase (I) and quadrature (Q) counters, which develop signals from which heading information is calculated.

10 Claims, 1 Drawing Sheet

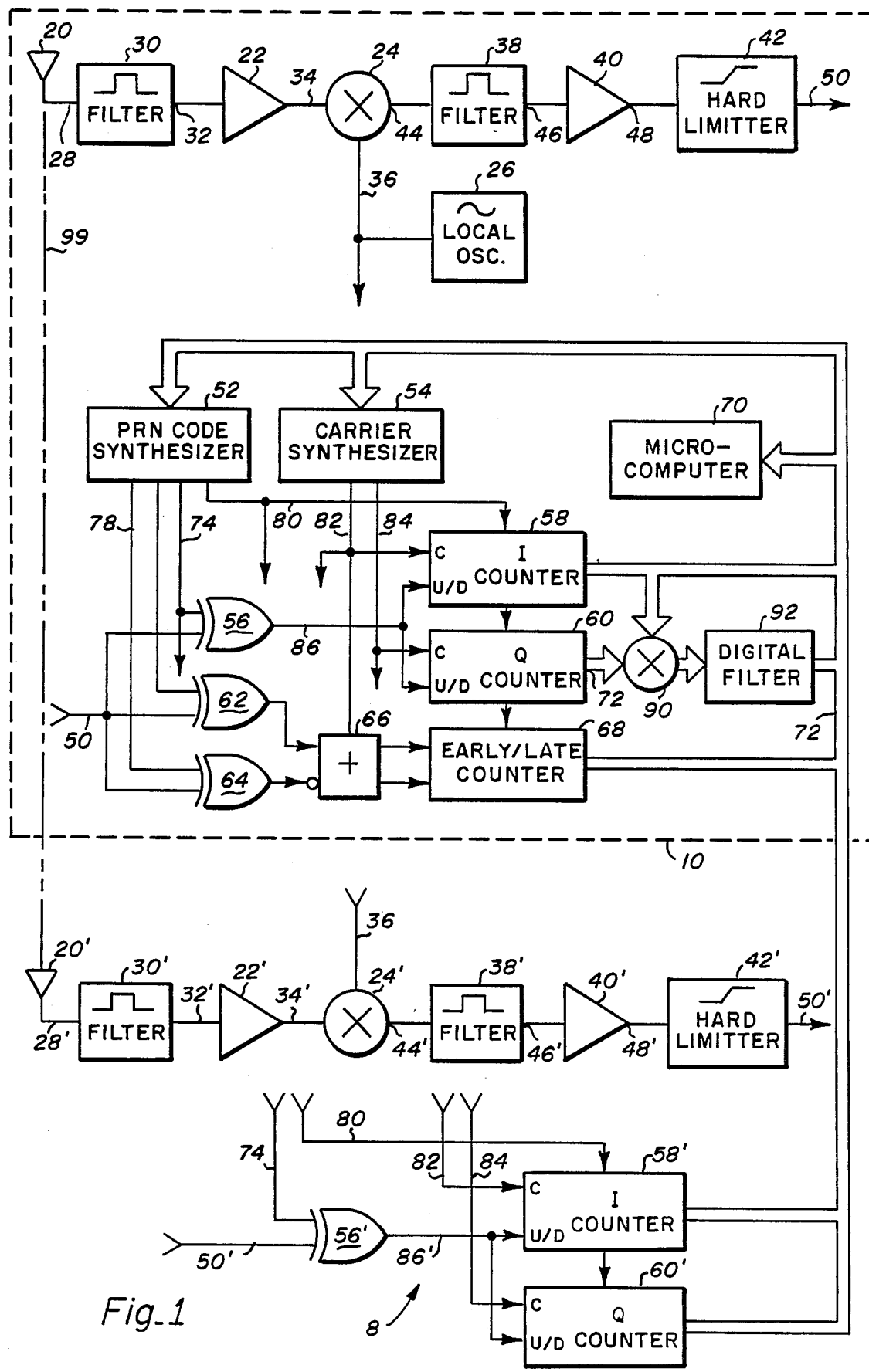
Fig_1

GLOBAL POSITIONING SYSTEM COURSE ACQUISITION CODE RECEIVER

BACKGROUND OF THE INVENTION

1. Field of the Invention

The present invention relates to radio receivers generally and more particularly to a GPS satellite receiver employing means for computing heading information.

2. Description of the Prior Art

The NAVASTAR Global Positioning System (GPS) is a U.S. Defense Department satellite-based radio-navigation system transmitting information from which extremely accurate navigational information can be computed including the time, the user's three-dimensional position anywhere on or near the Earth, and the user's three-dimensional velocity. When fully operational, the GPS is planned to employ 18 satellites evenly dispersed in three, inclined, 12-hour circular orbits chosen to insure continuous 24-hour coverage worldwide. Each satellite carries extremely accurate cesium and rubidium vapor atomic clocks providing timing information. Additionally, each satellite is provided clock correction and orbital information by Earth-based monitoring stations.

Each satellite transmits a pair of L-band carrier signals including an L1 signal having a frequency of 1575.42 MHz (also referred to as 1540 f0 where f0 is 1.023 MHz) and an L2 signal having a frequency of 1227.6 MHz (1200 f0). The L1 and L2 signals are biphase modulated by pseudo-random noise (PRN) codes. The PRN codes facilitate multiple access. Since each satellite uses different PRN codes, a signal transmitted by a particular satellite can be selected by generating and matching (correlating) the corresponding PRN code pattern. Additionally, the PRN codes facilitate signal transmit time measurements which can be made by measuring the phase shift required to match the code. Both of the carrier signals (L1 and L2) are modulated by a PRN code which is referred to as a precision (p) code. The p PRN code, which is intended for military purposes, is a relatively long, fine-grained, precision code having a clock rate of 10.23 MHz (10 f0). The L1 carrier signal is additionally modulated by a PRN code which is referred to as a clear/acquisition (C/A) code. The C/A PRN code, which is intended for rapid signal acquisition and for commercial purposes, is a relatively short, coarsegrained code having a clock rate of 1.023 MHz (f0) and a code length of 1023 bits (one ms). A full bit (chip) of C/A PRN code, phase delay corresponds to a distance of 293 meters. In addition to the PRN codes, both of the signals (L1 and L2) are, continuously, biphase modulated by a 50 bit per second, 1500 bit long, navigation data bit stream. The navigation data bit stream includes information as to the status and emphemeris of all satellites, parameters for computing the particular satellite clock, and corrections for atmospheric propagation delays.

Disclosed in the U.S. Patent Application Ser. No. 06/607,824 filed May 7, 1984 now U.S. Pat. No. 4,754,465 of Charles R. Trimble is a Global Positioning System Course Acquistion Code Receiver suitable for computing the position and velocity information. However, the above mentioned receiver, as disclosed, lacks means for computing heading information (including yaw and pitch or roll).

SUMMARY OF THE PRESENT INVENTION

It is therefore an object of the present invention to provide a GPS satellite receiver which has means for computing heading information.

Another object of the present invention is to provide a GPS satellite receiver which is relatively simple, inexpensive, and compact.

Briefly, the presently preferred embodiment of a GPS satellite receiver in accordance with the present invention employs the components of the receiver which is disclosed in the above identified United States Patent Application of Charles R. Trimble. More particularly, employed, in a "first receiver channel", is a (first) L-band antenna for GPS signal reception, a bandpass filter for attenuating off-frequency signals, a (first) amplifier for establishing the receiver noise figure, and a (first) image-reject mixer all connected in cascade. In addition, a (sole) half-frequency local-oscillator-signal-generating oscillator connected to also drive the mixer is employed. Also employed in the "first receiver channel" is another (second) amplifier, another bandpass filter and a (first) hard limiter all connected in cascade from the (first) mixer output. The (first) hard limiter converts the (first channel) (four f0) down-converted satellite signal and associated noise from analog-to-digital form.

Additionally, the receiver employs a phase-controlled synthesizer for generating the pertinent PRN code in the form of a punctual, an early and a late signal and a frequency-controlled synthesizer for developing digital, phase-quadrature signals at the down-converted (doppler-shifted) carrier frequency (four f0). A (first) exclusive-OR gate connected to develop a signal by comparing the signal developed by the (first) hard limiter with the punctual PRN-code signal and a (first) pair of counters connected to be clocked in quadrature by the Doppler-shifted carrier-synthesizer-developed signals and to be incremented/decremented responsive to the state of the gate-developed signal are employed to remove the PRN-code-modulation information and to develop a (first) in phase (I) and a (first) quadrature (Q) Castas-loop signals. Circuitry represented by a pair of exclusive-OR gates connected to develop a pair of signals by comparing the hard-limiter-developed signal one with the early PRN-code signal and the other with the late PRN-code signal; an adder connected to develop a signal by summing the exclusive-OR-gate-pair-developed signals and a counter connected to be clocked by the in-phase one of the Doppler-shifted carrier-synthesizer-developed signals and incremented/checked/decremented responsive to the state of the adder-developed signal is employed to develop a signal used to minimize PRN-code-phase-matching error. Finally, the receiver employs a microcomputer connected to receive the (first) in phase (I), the (first) quadrature (Q) and the matching-error signals to control the phase of the PRN-code synthesizer and the frequency of the Doppler-shifted-carrier synthesizer and to compute the position and velocity information.

In addition to the components of the receiver disclosed in the above identified United States Patent Application of Charles R. Trimble, the presently preferred embodiment of a GPS satellite receiver in accordance with the present invention employs, in a "second receiver channel", another (second) L-band antenna for GPS signal reception, another bandpass filter for attenuating off-frequency signals, still another (third) amplifier for establishing the receiver noise figure, and another (second) image-reject mixer, the latter components all being connected in cascade. The later (second) mixer is also connected to be driven by the former (sole) half-frequency local-oscillator-signal-generating oscillator. Also employed in the "second receiver channel" is yet another (fourth) amplifier, another bandpass filter and another (second) hard limiter, the later components all being connected in cascade from the (second) mixer output. Similarly, the (second) hard limiter converts the (second channel) (four f0) down-converted satellite signal and associated noise from analog-to-digital form.

Additionally, the receiver employs a (second) exclusive-OR gate connected to develop a signal by comparing the signal developed by the (second) hard limiter with the punctual PRN-code signal and a (second) pair of counters connected to be clocked in quadrature by the Doppler-shifted carrier-synthesizer-developed signals and to be incremented-decremented responsive to the state of the (second) exclusive-OR gate-developed signal are employed to remove the PRN-code-modulation information and to develop a (second) in phase (I) and a (second) quadrature (Q) Castas-loop signals, also for driving the microcomputer. From the (second) in phase (I) and the (second) quadrature (Q) signals the microcomputer computes the heading information.

These and other objects of the present invention will no doubt become apparent to those skilled in the art after having read the detailed description of the presently preferred embodiment of the present invention which is illustrated in the figure of the drawing.

IN THE DRAWING

FIG. 1 is a block diagram illustrating the presently preferred embodiment of a GPS satellite receiver in accordance with the present invention.

DETAILED DESCRIPTION OF THE PREFERRED EMBODIMENT

Illustrated in FIG. 1 of the drawing generally designated by the number 8 is the presently preferred embodiment of a GPS satellite receiver in accordance with the present invention. Receiver 8 employs the components of the receiver which is disclosed in the above identified U.S. Patent application of Charles R. Trimble. The components of the later receiver are collectively designated by the number 10. More particularly, receiver 10 employs a (first) L-band antenna 20, a (first) amplifier 22, a (first) image-reject mixer 24, and a (sole) local oscillator 26. In the presently preferred embodiment, antenna 20 is of the quadrifilar-helix-type. For clarity, antenna 20 is shown connected by a line 28, a band-pass filter 30 and a line 32 to the input of amplifier 22. In the presently preferred embodiment, the filtering function is performed by amplifier 22 which, preferably, is of the two-stage GaAs-FET type to provide a signal gain of 35 db and a three db bandwidth of 200 MHz at 1540 f0. Mixer 24, which is configured with the mixer RF input connected to the output of amplifier 22 by a line 34 and the mixer L0 input connected to the output of local oscillator 26 by a line 36, is of the starved-L0 balanced-type to cancel (reject) signals and noise at the mixer image frequency (1532 f0).

Oscillator 26 is operative to generate a 768 f0 signal the level of which is sufficient to cause mixer 24 to double the frequency of the signal to 1536 f0 for mixing with an L1 (1540 f0) satellite signal to down convert the frequency of the satellite signal directly to four f0.

Receiver 10 also employs another (second) filter, designated 38, another (second) amplifier, designated 40, and a (first) hard limiter 42. Filter 38, which is connected to the output of mixer 24 by a line 44, and to the input of amplifier 40 by a cable 46, is of the six-pole, passive, band-pass-type having a center frequency of four f0 and a three db bandwidth of two MHz. Amplifier 40 provides a gain of approximately 40 to 50 db, the gain being chosen to insure that hard limiter 42 provides hard limiting. Hard limiter 42, which is configured with the limiter input connected to the output of amplifier 42 by a cable 48 and the limiter output connected to a line 50, is employed to convert from analog-to-digital form the (first receiver channel) down-converted satellite signal and associated noise developed by amplifier 40 on line 48.

As previously indicated, hard limiter 42 is employed to convert from analog-to-digital form the signal developed by amplifier 40 on line 48, which includes both the down-converted satellite signal and the associated noise. It is important to note that because of the bandwidth, the level of the noise is substantially greater than the down-converted satellite-signal level. Thus, although the digital resolution of hard limiter 42 is but a single bit, no information is lost.

Additionally, receiver 10 employs a phase-controlled PRN-code-signal synthesizer 52, a frequency-controller Doppler-shifted carrier-signal synthesizer 54, an exclusive-OR gate 56, two counters, designated 58 and 60, two additional exclusive-OR gates, designated 62, and 64, and adder 66, another counter 68, and a microcomputer 70. Synthesizer 52 is responsive to signals developed on a bus 72 by microcomputer 70 both for selecting a PRN-code and for controlling the phase of the code and operative to develop signals including on a line 74 a punctual PRN-code signal, on a line 76 a similar signal advanced (early) one-half bit (with respect to the punctual signal), on a line 78 a similar signal retarded (late) one-half bit (also with respect to the punctual signal), and on a line 80 a PRN-code-timing (epoch) signal.

Synthesizer 54 is responsive to signals developed on bus 72 by microcomputer 70 for controlling, to within one-quarter Hz resolution, the synthesizer frequency and operative to generate a pair of digital signals in phase quadrature, each on a corresponding one of a pair of lines, designated 82 and 84.

For clarity, a single exclusive-OR gate, gate 56, is shown connected to compare the state of the signal developed by hard limiter 42 on line 50 with the state of the punctual PRN-code signal developed by synthesizer 52 on line 74 to develop on a line 86 a signal for driving both counters 58 and 60. In the presently preferred embodiment, two exclusive-OR gates are used, one for driving counter 58 and the other for driving counter 60. Further, the signals for driving the former gate are each latched for proper timing.

Counters 58, 60 and 68 are incremented when the state of a given one, and only one, of the early and late PRN-code signals developed on lines 76 and 78 is the same as (correlates in state with) the state of the signal developed by hard limiter 42 on line 50, decremented when only the other one correlates, and not changed (checked) when both correlate or neither correlates.

Mircrocomputer 70 is connected to bus 72 both to receive the signals developed by counters 58, 60, and 68 and to develop signals for controlling synthesizers 52 and 54. To receive the L1 signal transmitted by a particular satellite, microcomputer 70 is operative to cause PRN-code synthesizer 52 to develop the associated PRN code. Also, microcomputer 70 is responsive to the signals developed by (early/late) counter 68 and operative to control the phase of the synthesizer 52 developed PRN-code signals so as to phase-lock the phase of the punctual PRN-code signal developed on line 74 to the phase of the corresponding down-converted satellite signal. Additionally, microcomputer 70 is responsive to the signals developed by (Q) counter 60 and operative to control the frequency of the synthesizer 54 developed Doppler-shifted-carrier signals so as to phase-lock the frequency of the synthesized signals to the frequency of the down-converted satellite signal. Further, microcomputer 70 is responsive to the transmit time information obtained from controlling synthesizer 52, the relative velocity information obtained from controlling synthesizer 54 and the navigational data bit stream information obtained from (I) counter 58 and operative to computer the position and velocity information.

Microcomputer 70 compensates for the (navigational data bit stream) biphase modulation on the down-converted satellite signal to phase-lock synthesizer 54. Specifically, microcomputer 70 is responsive to the binary state of the signal representing the sign bit of the (count) signals developed by (I) counter 58 and operative to invert/or not, the sign bit signal of the (Q) counter 60 developed signals. For clarity, the sign-bit-inverting and subsequent digital-filtering steps performed by microcomputer 70 are represented by separate blocks including a mixer 90 and a second-order discrete-time-sample filter 92.

Further, microcomputer 70 compensates for variations in the down-converted satellite-signal level to maintain the synthesizer 54 phase-locked-loop-gain constant. Microcomputer 70 is responsive to the (I) counter 58 signals and operative to adjust the filter 92 gain parameters. (It is important to note that rather than reflecting the signal level, the (I) counter 58 developed signals reflect the signal to noise ratio. However, the noise level is relatively constant.)

Antenna 20, amplifier 22, mixer 24, local oscillator 26, filter 38, amplifier 40, and hard limiter 42 form what is referred to herein as a "first receiver channel".

In addition to the components of the receiver (10) disclosed in the above identified U.S. Patent application of Charles R. Trimble, receiver 8 employs another (second) L-band antenna 20', another (third) amplifier 22', another (second) image-reject mixer 24', another (second) filter 38', yet another (fourth) amplifier 40', and another (second) hard limiter 42', in what is referred to herein as a "second receiver channel". The components in the "second receiver channel" are similar to those in the "first receiver channel". In addition, the components in the "second receiver channel" are similarly configured as those in the "first receiver channel". However, it is important to note that only one local oscillator (26) is employed. The (sole) local oscillator (26) is connected to simultaneously drive both image-reject mixer 24 and image-reject mixer 24'. More specifically, for clarity, antenna 20' is shown connected by a line 28', a band-pass filter 30' and a line 32' to the input of amplifier 22'. Mixer 24' is configured with the mixer RF input connected to the output of amplifier 22' by a line 34' and the mixer LO input connected to the output of local oscillator 26 by line 36. Filter 38' is connected to the output of mixer 24' by a line 44', and to the input of amplifier 40' by a cable 46'. Limiter 42' is configured with the limiter input connected to the output of amplifier 42' by a cable 48' and the limiter output connected to a line 50'.

Thus, hard limiter 42' develops on line 50' a signal, which differs from the one developed on line 50 by hard limiter 42 only in "phase". In other words, when one of the two antennas (20 and 20") is further from the satellite then the other one, one of the two signals (developed on the lines 50 and 50') will be delayed a period of time equal to the difference in the satellite to antenna propagation times.

Additionally, receiver 8 employs an exclusive-OR gate 56' and two counters, designated 58' and 60'. Again, for clarity, a single exclusive-OR gate, gate 56', is shown connected to compare the state of the signal developed by hard limiter 42' on line 50' with the state of the punctual PRN-code signal developed by synthesizer 52 on line 74 to develop on a line 86' a signal for driving both counters 58' and 60'. Again, in the presently preferred embodiment, two exclusive-OR gates are used, one for driving counter 58' and the other for driving counter 60'. Further, the signals for driving the former gate are each latched for proper timing.

In one embodiment, counters 58' and 60', which are similar to counters 58 and 60, each include three 74LS193 type devices (four-bit up/down counter) which are connected in cascade to form a 12-bit counter. Additionally, counter 58 includes one, and counter 60 includes one and one-half 74LS374 type devices (octal-latch) connected to latch and state of the signals representing the count developed by the respective 12-bit counter and to selectively couple the latched signals onto bus 72. Counters 58' and 60' also include a number of 74LS175 type flip-flops and a number of gates configured to develop a count-up signal and a count-down signal suitable for driving each of the 12-bit counters from the (count up/down) signal developed on line 86' and the (clocking) signals developed on lines 82 and 84.

Similarly, Counters 58' and 60' are incremented when the state of a given one, and only one, of the early and late PRN-code signals developed on lines 76 and 78 is the same as (correlates in state with) the state of the signal developed by hard limiter 42' on line 50', decremented when only the other one correlates, and not changed (checked) when both correlate or neither correlates.

In calculating a heading, microcomputer 70 calculates the bearing of one of the satellites. In addition, microcomputer 70 calculates the difference between the distance from the satellite to antenna 20 and the distance from the satellite to antenna 20'. In calculating this differential distance, microcomputer 70 calculates the difference in the arrival times to antennas 20 and 20' of the satellite signal. More specifically, microcomputer 70 calculates, in portions of an L1 carrier signal cycle, the phase difference between the "first receiver channel" and the "second receiver channel" signals by calculating the arctangent of the ratio of the number represented by signals developed on bus 72 by (Q) counter 60' to the number represented by signals developed on bus 72 by (I) counter 58'. Then, microcomputer 70 converts this phase difference to a differential distance by multiplying the phase difference by the wavelength of the L1 carrier signal (19.02937 cm) divided by two phi (or 360 degrees). Additionally, microcomputer 70 calculates the angle between the satellite bearing and a 99 line which extends between the antennas (20 and 20') by calculating the arccosine of the ratio of the differential distance to the antenna (20 and 20') spacing. Finally, with the use of other satellites, any ambiguity is resolved. (When the line which extends between the antennas is aligned with the principal axis of a ship or airplane, the heading so calculated corresponds to the heading of the ship or airplane.) (In another embodiment, components forming a "third receiver channel", another exclusive OR gate, another (I) counter, and another (Q) counter are employed. Preferably, the "third receiver channel" antenna is disposed along a line which extends perpendicular to the line which extends between antennas 20 and 20'. With these additional components, the microcomputer calculates roll as well as heading, yaw and pitch.)

In the presently preferred embodiment, synthesizers 52 and 54, gates 56, 62, 64, and 56', counters 58, 60, 68, 58', and 60', and adder 66 are all integrated in a single gate-array-type device.

It is contemplated that after having read the preceding disclosure, certain alterations and modifications of the present invention will no doubt become apparent to those skilled in the art. It is therefore intended that the following claims be interpreted to cover all such alterations and modifications as fall within the true spirit and scope of the invention.

What is claimed is:

1. A receiver comprising in combination:
   means for generating a local oscillator signal;
   a first receiver channel including,
     means for receiving a transmitted signal, and
     down-converting means connected to said local-oscillator-generating means, said first receiver-channel down-converting means for mixing said local-oscillator signal with a signal derived from said first receiver-channel received signal to generate a first down-converted signal;
   a second receiver channel including,
     means for receiving said transmitted signal, and
     down-converting means connected to said local-oscillator-generating means, said second receiver-channel down-converting means for mixing said local-oscillator signal with a signal derived from said second receiver-channel received signal to generate a second down-converted signal;
   carrier-synthesizer means for generating a signal having a frequency established by carrier-synthesizer-means-driving signals;
   first counter means coupled to said first receiver channel and connected to said carrier-synthesizer means, said first counter means for developing signals representing a count which is incremented at each of a series of times marked by said carrier-synthesizer-means-generated signal when a signal developed from said first down-converted signal has a predetermined one of two states and decremented at each of said carrier-synthesizer-means-generated-signal marked times otherwise;
   second counter means coupled to said second receiver channel and connected to said carrier-synthesizer means, said second counter means for developing signals represented a count which is incremented at each of a series of times marked by said carrier-synthesizer-means-generated signal when a signal developed from said second down-converted signal has a predetermined one of two states and decremented at each of said carrier-synthesizer-means-generated-signal marked times otherwise; and
   controller means connected to said carrier-synthesizer means and connected to said first and said second counter means, said controller means being responsive to said first-counter-means-developed signals and operative to develop said carrier-synthesizer-means-driving signals so as to lock the frequency of said carrier-synthesizer-means-generated signal to the frequency of said first down-converted signal.

2. A GPS satellite receiver comprising in combination:
   means for generating a local oscillator signal;
   a first receiver channel including,
     means for receiving a satellite signal, and
     down-converting means conencted to said local-oscillator-generating means, said first receiver-channel down-converting means for mixing said local-oscillator signal with a signal derived from said first receiver-channel received-satellite signal to generate a first down-converted satellite signal;
   a second receiver channel including,
     means for receiving said satellite signal, and
     down-converting means connected to said local-oscillator-generating means, said second receiver-channel down-converting means for mixing said local-oscillator signal with a signal derived from said second receiver-channel received-satellite signal to generate a second down-converted satellite signal;
   carrier-synthesizer means for generating a first signal having a frequency established by carrier-synthesizer-means-driving signals;
   first Q-counter means coupled to said first receiver channel and connected to said carrier-synthesizer means, said first Q-counter means for developing signals representing a count which is incremented at each of a series of times marked by said carrier-synthesizer-means-generated first signal when a signal developed from said first down-converted satellite signal has a predetermined one of two states and decremented at each of said carrier-synthesizer-means-generated-first-signal marked times otherwise;
   second Q-counter means coupled to said second receiver channel and connected to said carrier-synthesizer means, said second Q-counter means for developing signals representing a count which is incremented at each of a series of times marked by said carrier-synthesizer-means-generated first signal when a signal developed from said second down-converted satellite signal has a predetermined one of two states and decremented at each of said carrier-synthesizer-means-generated-first-signal marked times otherwise; and
   controller means connected to said carrier-synthesizer means and connected to said first and said second Q-counter means, said controller means being responsive to said first Q-counter-means-developed signals and operative to develop said carrier-synthesizer-means-driving signals so as to lock the frequency of said carrier-synthesizer-means-generated first signal to the frequency of said first down-converted satellite signal.

3. A GPS satellite receiver as recited in claim 2 wherein said carrier-synthesizer means further generates a second signal which is in phase quadrature with said carrier-synthesizer-means-generated first signal and wherein the receiver further comprises first I-counter means coupled to said first receiver channel, connected to said carrier-synthesizer means and connected to said controller means, said I-counter means for developing controller-means-driving signals representing a count which is incremented at each of a series of times marked by said carrier-synthesizer-means-generated second signal when said signal developed from said first down-converted satellite signal has a predetermined one of two states and decremented at each of said second carrier-synthesizer-means-generated-signal marked times otherwise.

4. A GPS satellite receiver as recited in claim 3 further comprising second I-counter means coupled to said second receiver channel, connected to said carrier-synthesizer means and connected to said controller means, said I-counter means for developing controller-means-driving signals representing a count which is incremented at each of a series of times marked by said carrier-synthesizer-means-generated second signal when said signal developed from said second down-converted satellite signal has a predetermined one of two states and decremented at each of said second carrier-synthesizer-means-generated-signal marked times otherwise.

5. A GPS satellite receiver as recited in claim 2 wherein said carrier-synthesizer means further generates a second signal which is in phase quadrature with said carrier-synthesizer-means-generated first signal and wherein the receiver further comprises I-counter means coupled to said second receiver channel, connected to said carrier-synthesizer means and connected to said controller means, said I-counter means for developing controller-means-driving signals representing a count which is incremented at each of a series of times marked by said carrier-synthesizer-means-generated second signal when said signal developed from said second down-converted satellite signal has a predetermined one of two states and decremented at each of said second carrier-synthesizer-means-generated-signal marked times otherwise.

6. A GPS satellite receiver comprising in combination:
  means for generating a local oscillator signal;
  a first receiver channel including,
    means for receiving a satellite signal which is biphase modulated by a PRN code, and
    down-converting means connected to said local-oscillator-generating means, said first receiver-channel down-converting means for mixing said local oscillator signal with a signal derived from said first receiver-channel received-satellite signal to generate a first down-converted satellite signal;
  a second receiver channel including,
    means for receiving said satellite signal, and
    down-converting means connected to said local-oscillator-generating means, said second receiver-channel down-converting means for mixing said local oscillator signal with a signal derived from said second receiver-channel received-satellite signal to generate a second down-converted satellite signal;
  carrier-synthesizer means for generating a first signal having a frequency established by carrier-synthesizer-means-driving signals;
  PRN-code-synthesizer means for generating an early, a punctual, and a late signal each representing said PRN code and each having a phase established by PRN-code-synthesizer-means-driving signals;
  first exclusive-OR-gate means connected to said PRN-code-synthesizer means and connected to said first receiver channel, said first exclusive-OR-gate means for comparing the state of a signal developed from said first down-converted satellite signal with the state of said PRN-code-synthesizer-means-generated punctual signal to develop a signal,
  second exclusive-OR-gate means connected to said PRN-code-synthesizer means and connected to said second receiver channel, said second exclusive-OR-gate means for comparing the state of a signal developed from said second converted satellite signal with the state of said PRN-code-synthesizer-means-generated punctual signal to develop a signal,
  first Q-counter means connected to said first receiver channel, connected to said carrier-synthesizer means, and connected to said first exclusive-OR-gate means, said first Q-counter means for developing signal representing a count which is incremented at each of a series of times marked by said carrier-synthesizer-means-generated first signal when said first exclusive-OR-gate-developed signal has a predetermined one of two states and decremented at each of said carrier-synthesizer-means-generated-first-signal marked times otherwise;
  second Q-counter means connected to said second receiver channel, connected to said carrier-synthesizer means, and connected to said second exclusive-OR-gate means, said second Q-counter means for developing signals representing a count which is incremented at each of a series of times marked by said carrier-synthesizer-means-generated first signal when said second exclusive-OR-gate-developed signal has a predetermined one of two states and decremented at each of said carrier-synthesizer-means-generated-first-signal marked times otherwise; and
  controller means connected to said carrier-synthesizer means and connected to said first and said second Q-counter means, said controller means being responsive to said first Q-counter-means-developed signals and operative to develop said carrier-synthesizer-means-driving signals so as to lock the frequency of said carrier-synthesizer-means-generated first signal to the frequency of said first down-converted satellite signal.

7. A GPS satellite receiver as recited in claim 6 further comprising early/late means connected to said PRN-code synthesizer, connected to said first receiver channel, and connected to said controller means, said early/late means for comparing the state of said signal developed from said first down-converted satellite signal with the state of said early and said late PRN-code-synthesizer-means-developed signals to develop controller-means-driving signals representing the difference between an early and a late count, and wherein said controller means is further responsive to said early/late-means-developed signals and operative to develop said PRN-code-synthesizer-means-driving signals so as to lock the phase of said PRN-code-synthesizer-developed signals to said satellite-signal PRN-code phase.

8. A GPS satellite receiver as recited in claim 7 wherein said carrier-synthesizer means further generates a second signal which is in phase quadrature with said carrier-synthesizer-means-generated first signal and wherein the receiver further comprises first I-counter means connected to said first exclusive-OR-gate means, connected to said carrier-synthesizer means and connected to said controller means, said I-counter means for developing controller-means-driving signals representing a count which is incremented at each of a series of times marked by said carrier-synthesizer-means-generated second signal when said first exclusive-OR-gate-developed signal has a predetermined one of two states and decremented at each of said second carrier-synthesizer-means-generated-signal marked times otherwise.

9. A GPS satellite receiver as recited in claim 8 further comprising second I-counter means connected to said second exclusive-OR-gate means, connected to said carrier-synthesizer means and connected to said controller means, said I-counter means for developing controller-means-driving signals representing a count which is incremented at each of a series of times marked by said carrier-synthesizer-means-generated second signal when said second exclusive-OR-gate-developed signal has a predetermined one of two states and decremented at each of said second carrier-synthesizer-means-generated-signal marked times otherwise.

10. A GPS satellite receiver as recited in claim 7 wherein said carrier-synthesizer means further generates a second signal which is in phase quadrature with said carrier-synthesizer-means-generated first signal and wherein the receiver further comprises I-counter means connected to said second exclusive-OR-gate means, connected to said carrier-synthesizer means and connected to said controller means, said I-counter means for developing controller-means-driving signals representing a count which is incremented at each of a series of times marked by said carrier-synthesizer-means-generated second signal when said second exclusive-OR-gate-developed signal has a predetermined one of two states and decremented at each of said second carrier-synthesizer-means-generated-signal marked times otherwise.

* * * * *